United States Patent [19]

Kimura et al.

[11] Patent Number: 4,599,653

[45] Date of Patent: Jul. 8, 1986

[54] FOCUS INDICATOR APPARATUS FOR AN ELECTRONIC CAMERA

[75] Inventors: Kenji Kimura; Masatoshi Ida, both of Tokyo, Japan

[73] Assignee: Olympus Optical Co. Ltd., Tokyo, Japan

[21] Appl. No.: 529,612

[22] Filed: Sep. 6, 1983

[30] Foreign Application Priority Data

Sep. 16, 1982 [JP] Japan .............................. 57-159437

[51] Int. Cl.$^4$ ............................................. H04N 5/30
[52] U.S. Cl. ...................................... 358/224; 358/227
[58] Field of Search ..................... 358/227, 224, 183; 354/406, 407, 409, 400; 340/721, 753, 754; 352/139, 140

[56] References Cited

U.S. PATENT DOCUMENTS

| | | | |
|---|---|---|---|
| 2,341,410 | 2/1944 | Mihalyi | 352/140 |
| 2,952,738 | 9/1960 | Akins | 358/224 |
| 3,787,619 | 1/1974 | Wolff | 358/183 |
| 4,253,751 | 3/1981 | Tokutomi et al. | 354/409 |
| 4,325,080 | 4/1982 | Satoh | 358/127 |
| 4,370,038 | 1/1983 | Kimura | 358/227 |

Primary Examiner—Gene Z. Rubinson
Assistant Examiner—Stephen Brinich
Attorney, Agent, or Firm—Frishauf, Holtz, Goodman & Woodward

[57] ABSTRACT

A focus indicator for a TV camera includes a first image sensor and a video processor which convert an object image to a first video signal, an optical system for exit pupil dividing part of the object image to prepare a split image, and a second image sensor for converting the split image to a second video signal. A composing circuit generates a composite video signal from the first and second video signals in such a way as to include the split image component, and a viewfinder displays an image including the split image. A user of the TV camera thus can perform focusing by observing the split image in the viewfinder.

12 Claims, 30 Drawing Figures

F I G. 5A   F I G. 5B
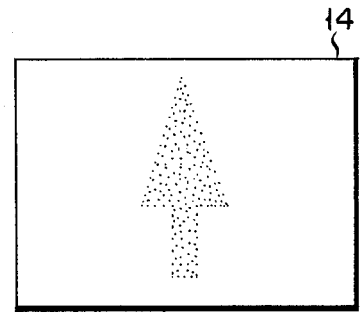 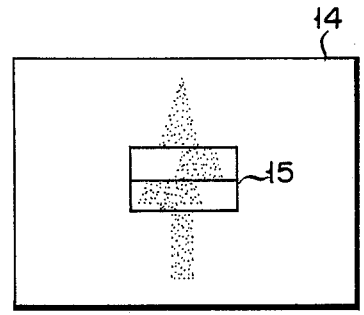
F I G. 5C   F I G. 5D
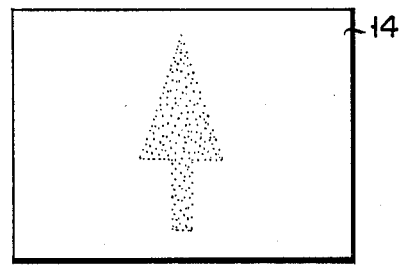 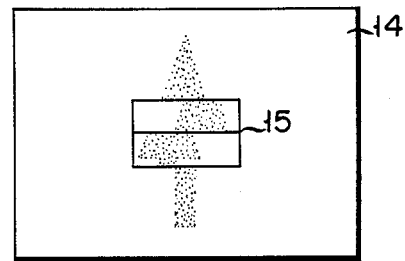
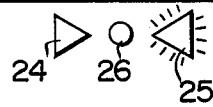 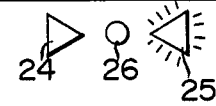
F I G. 5E 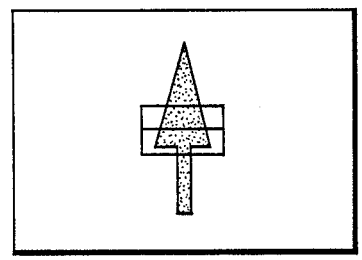

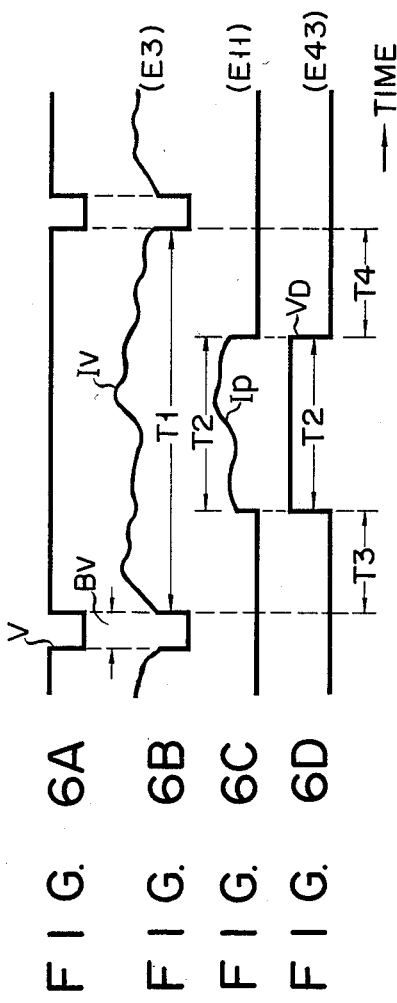
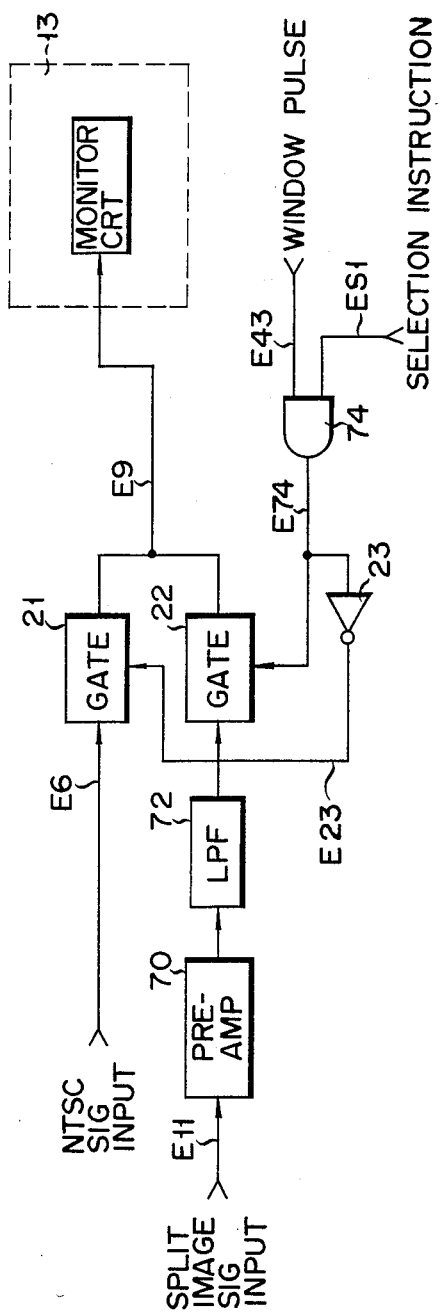

F I G. 8
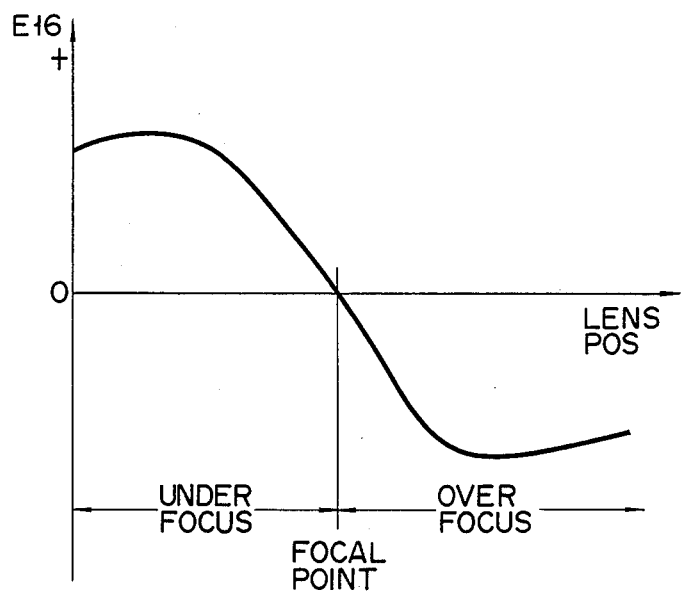
F I G. 9
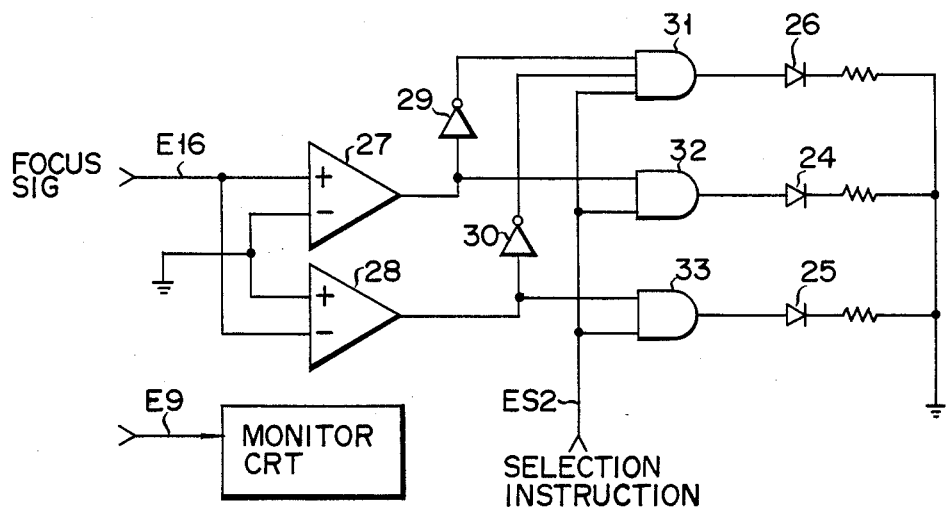

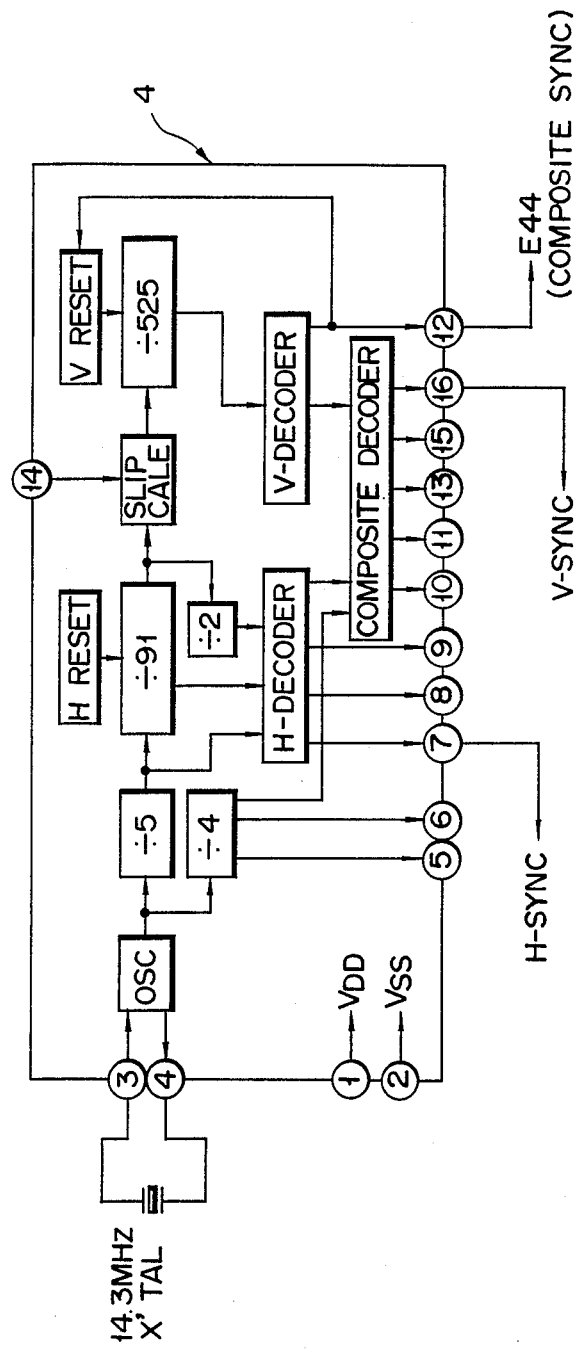
F I G. 12

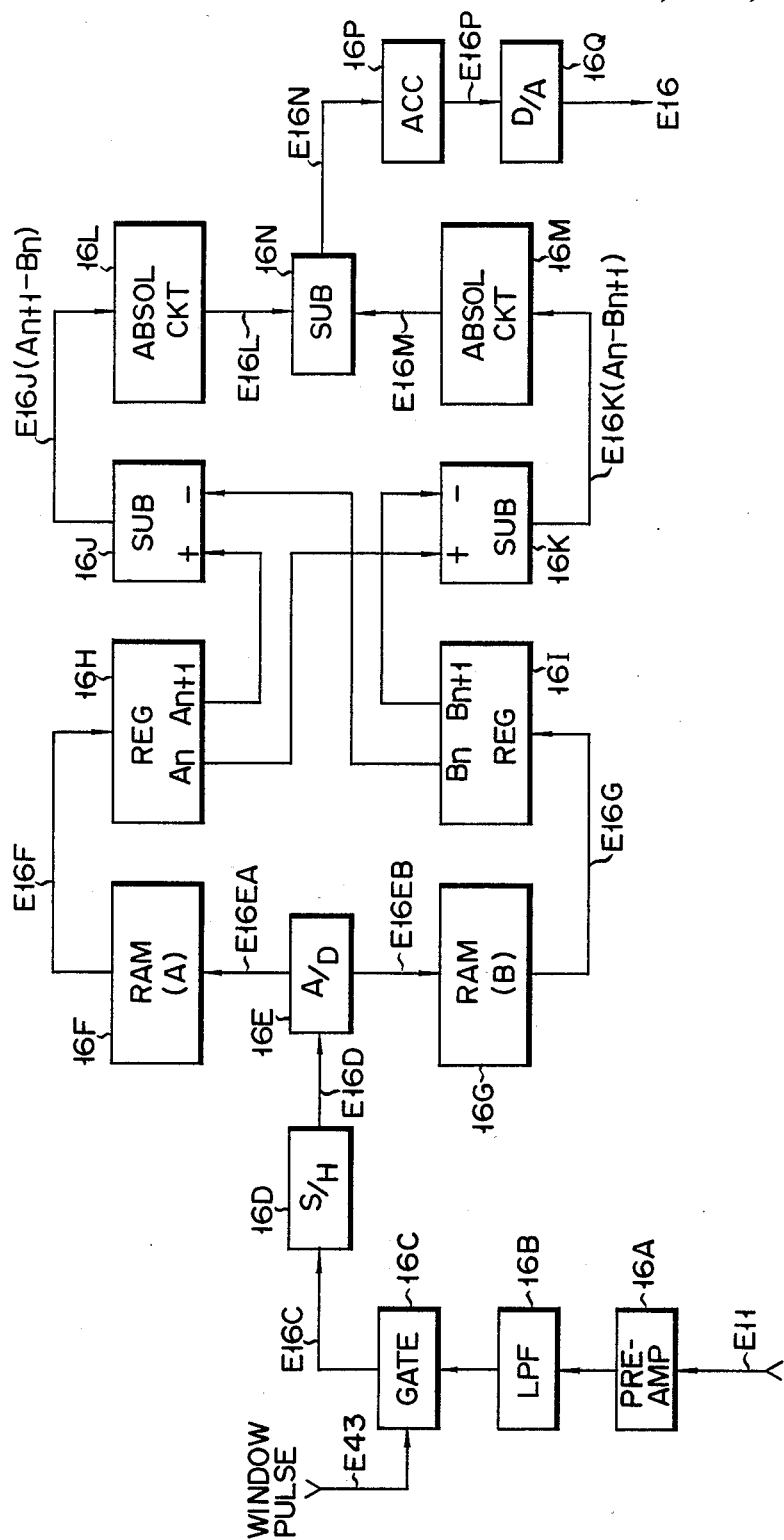
F I G. 14

FOCUS INDICATOR APPARATUS FOR AN ELECTRONIC CAMERA

BACKGROUND OF THE INVENTION

The present invention relates to a focus indicator apparatus for an electronic camera.

In a conventional electronic camera, such as a video camera, an operator observes a monitored image through a viewfinder for focusing. When focusing is performed while the state of focusing is being monitored, optimal focusing ("in focus") can only be achieved if the resolution of a monitor CRT is very high. In general, a CRT for an electronic camera viewfinder is very small and has low resolution. For these reasons, it is difficult to achieve optimal focusing and video-recording when the depth of field is very shallow.

SUMMARY OF THE INVENTION

In view of the above, a primary object of the present invention is to provide a focus indicator apparatus for achieving optimal focusing, even if the resolution of a monitored image is low.

To achieve the above object, at least one of the following techniques is used:

(1) A split image is formed on part of the monitor screen, in the same manner as in a single lens reflex camera. A nonsplit image state is made to coincide with the in-focus state.

(2) An indicator for indicating the in-focus state is provided within an area of a viewfinder, e.g., an out-of-focus state (called "over focus") caused by too short a distance between a camera and an object is indicated by a first LED, an out-of-focus state (called "under focus") caused by too long a distance between the camera and the object is indicated by a second LED, and the in-focus state is indicated by simultaneous OFF/flashing of the first and second LEDs, or by a third LED.

According to the split image method and/or LED indicator method, optimal focusing can be achieved, even if the monitor CRT has low resolution.

BRIEF DESCRIPTION OF THE DRAWINGS

FIGS. 3A to 3D show a configuration of an exit pupil dividing optical member, in which FIG. 3A is a plan view thereof, when viewed from a side opposite to a light-incident side, FIGS. 3B and 3C are side sectional views thereof, taken along lines b—b° and c—c°, respectively, and FIG. 3D is a perspective view showing a coupling condition of prisms 17 and 18, as shown in FIGS. 3B and 3C;

FIGS. 5A to 5E show examples of focus data display modes of the focus indicator apparatus shown in FIG. 1, in which FIGS. 5B and 5D show viewfinder split images according to the display method of the present invention;

FIGS. 6A to 6D are timing charts used in explaining the timings of pulses driving a focusing image sensor;

FIG. 7 is a block diagram showing the detailed configuration of video composing circuit 9, as shown in FIG. 1;

FIG. 8 is a graph used in explaining changes in the potential of focus data signal E16;

FIG. 9 is a circuit diagram of a discriminator arranged at the side of viewfinder 13 (FIG. 1) to display in-focus data, over-focus data or under-focus data, in accordance with focus data signal E16;

FIG. 12 is a block diagram showing the main portion of sync generator 4, as shown in FIG. 1;

FIG. 14 is a block diagram showing the configuration of focus detector 16, as shown in FIG. 1;

DETAILED DESCRIPTION OF THE PREFERRED EMBODIMENT

Figure 1:
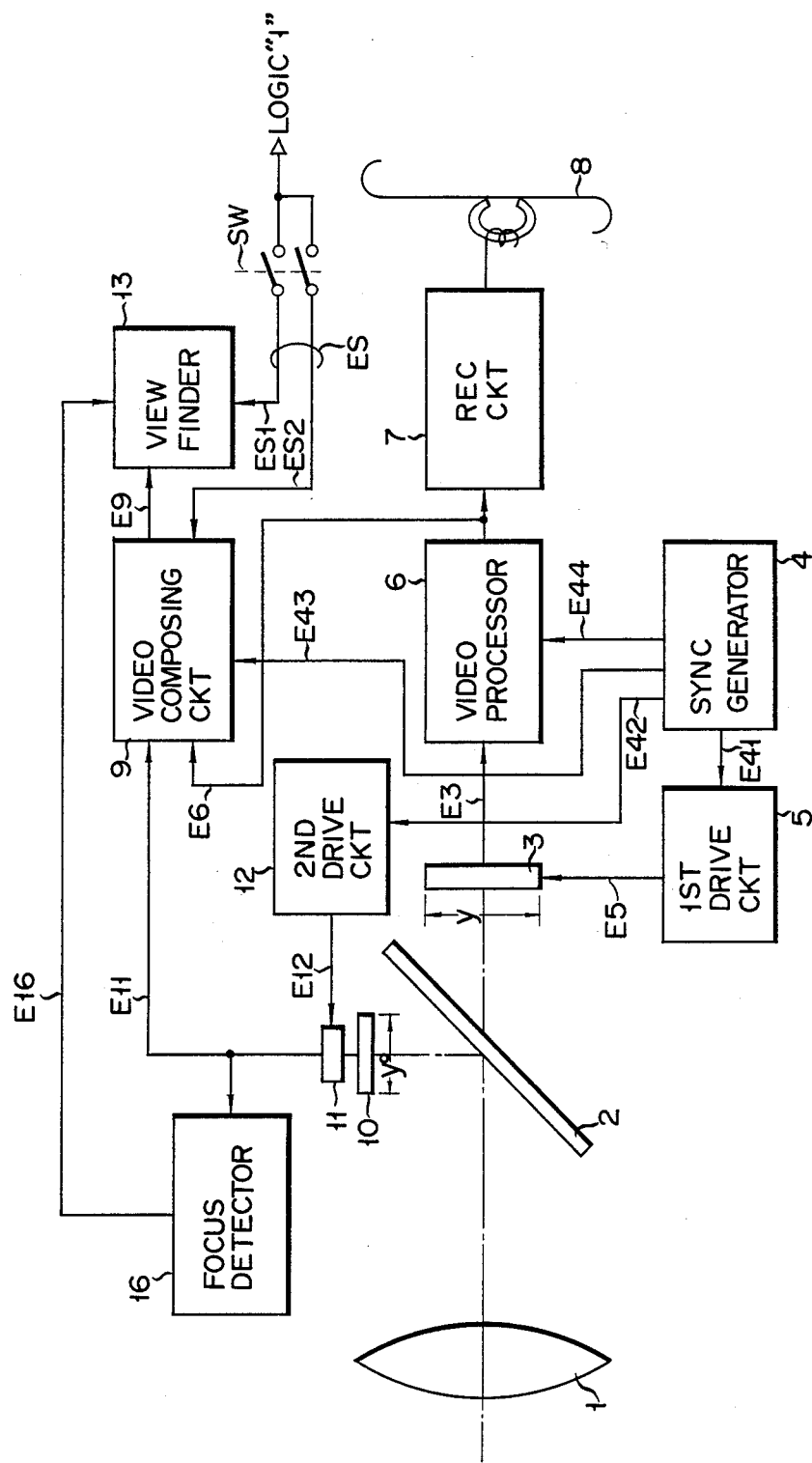
FIG. 1 is a block diagram of a configuration including a focus indicator apparatus according to an embodiment of the present invention.

Since the same reference numerals denote parts having the same functions throughout the drawings, repeated detailed descriptions thereof will be omitted.

FIG. 1 is a block diagram showing the configuration of a video camera embodied by the present invention.

With reference to FIG. 1, an object image formed by photographing lens 1 of an optical system is projected onto an image sensor 3 through a half mirror 2. The image is projected in such a way that a prescribed focal plane of the photographing lens 1 coincides with a focused plane.

Image sensor 3 comprises a solid-state image sensor or an image pickup tube for obtaining a color video signal in accordance with a given color system (NTSC, PAL, etc.). First drive circuit 5 generates a horizontal/vertical drive signal E5 in accordance with sync signal E41 from sync generator 4. When image sensor 3 is operated to scan an object image in accordance with drive signal E5, color video signal E3 corresponding to the object image is read out from image sensor 3. This color video signal E3 is converted by video processor 6 to, e.g., NTSC color television signal E6, in accordance with composite sync signal E44. NTSC color television signal E6 is then FM-modulated by recording circuit (REC CKT) 7. An FM-modulated signal is then recorded on video tape 8 and is also supplied to video composing circuit 9.

A bundle of light beams of the object image reflected by half mirror 2 is partially guided onto the focused surface of image sensor 11 through exit pupil dividing member 10 which is provided for exit pupil dividing the object image from photographing lens 1. Image sensor 11 has substantially the same configuration as image sensor 3. Image sensor 11 is so disposed as to be conjugate with image sensor 3. Image sensor 11 is driven in accordance with a horizontal/vertical drive signal E12 from second drive circuit 12. Image sensor 11 reads part of the object image as monochrome video signal E11. Second drive circuit 12 for driving image sensor 11 is controlled in response to sync signal E42 from sync generator 4. A photoelectric transduced output or video signal E11 is read from image sensor 11 at a timing synchronous with a read operation of image sensor 3.

Figure 2:
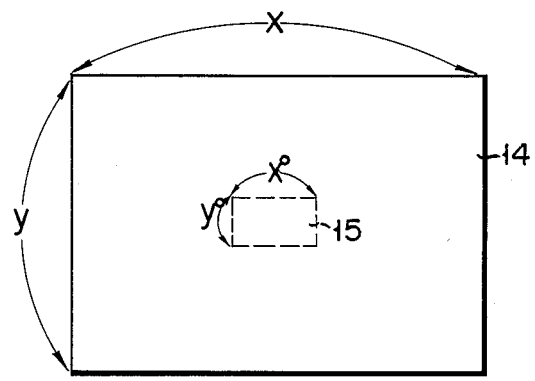
FIG. 2 is a representation of a display screen within viewfinder 13, as shown in FIG. 1.

The area of image sensor 11 corresponding to its angle of view is preferably smaller than ¾ that of image sensor 3. Then, image sensor 11 produces video signal E11 which has the same focus data as part of the object image obtained by image sensor 3 and which corresponds to part of the object image. This video signal E11 is supplied to video composing circuit 9 and is combined with NTSC color television signal E6 from video processor 6 in accordance with window pulse E43 from sync generator 4, as shown in FIG. 2. Video signal E9 corresponding to the composite image is supplied from video composing circuit 9 to a monitor CRT circuit provided in viewfinder 13. An image corresponding to the focused video signal E11 is reproduced as a monochrome image on a monitor screen 14 of the monitor CRT in viewfinder 13.

Referring to FIG. 2, the area of screen 14 encompasses the entire range of the image reproduced at viewfinder 13 and corresponds to the output image of image sensor 3. The small image portion indicated at 15 corresponds to the reproduced image portion produced by image sensor 11 and represents a split image reproducing range. In this case, when image sensors 3 and 11 comprise identical image sensors having the same number of pels, the ratio of the display area utilized by image sensor 3 at viewfinder 13 to that utilized by image sensor 11 thereat can be arbitrarily changed. A change in this ratio can be performed in accordance with window pulse E43.

In this embodiment, as shown in FIG. 2, the screen area of image sensor 3 is determined by a two-dimensional photoelectric transducer element to be x.y, where x=500 pels and y=350 pels. On the other hand, the split image reproducing area is determined to be x°.y°, where x°=200 pels and y°=100 pels.

Figure 3A:
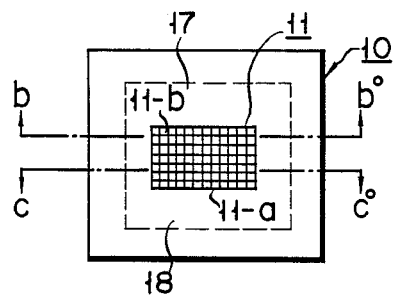
Figure 3B:
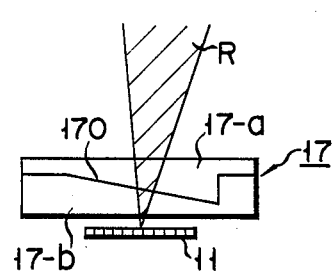
Figure 3C:
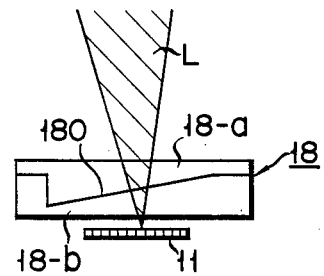
Figure 3D:
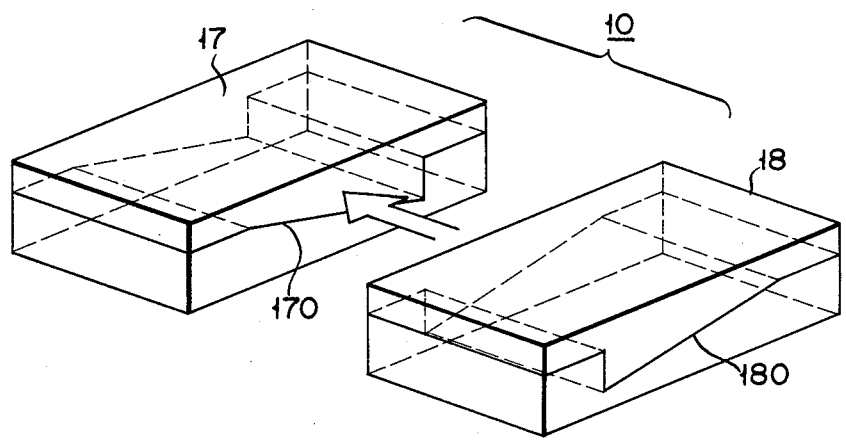

FIGS. 3A to 3D show the configuration of exit pupil dividing member 10, with respect to image sensor 11, in which FIG. 3A is a plan view thereof when viewed from a side opposite to the object-light incident surface, FIGS. 3B and 3C are sectional views thereof taken along lines b—b° and c—c°, respectively, and FIG. 3D is a perspective view showing a coupling condition of prisms 17 and 18 of FIGS. 3B and 3C. As shown in FIG. 3D, exit pupil dividing member 10 comprises critical angle prisms 17 and 18, which respectively have reflecting tilt surfaces 170 and 180. Reflecting tilt surfaces 170 and 180 are properly inclined in opposite directions. As shown in FIG. 3A, critical angle prisms 17 and 18 are parallel to each other with respect to the light incident surface of image sensor 11.

Critical angle prism 17 has two optical elements 17-a, 17-b which oppose each other across a very small air gap, to thereby constitute reflecting tilt surface 170. Similarly, critical angle prism 18 has two optical elements 18-a, 18-b which oppose each other across a very small air gap, to thereby constitute reflecting tilt surface 180. Bundles R and L of light rays from first and second regions of the photographing lens 1 are independently incident on portions 11-b and 11-a of image sensor 11, which oppose critical angle prisms 17 and 18, respectively, in accordance with the dependence of the refractive indices at boundaries between reflecting tilt surfaces 170 and 180 and the corresponding air gaps, respectively. The first and second regions correspond to upper and lower regions with respect to, as a boundary, a plane perpendicular to the drawing (FIG. 1) surface and including the optical axis (alternate long and short dashed line) of the photographing lens 1.

Figure 4:
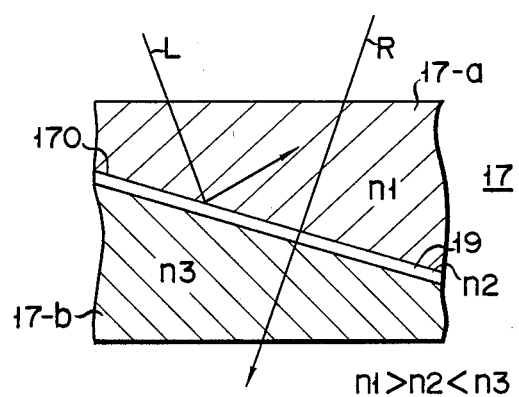
FIG. 4 is a representation used in explaining the behavior of the exit pupil dividing optical member shown in FIGS. 3A to 3D.

As shown in detail in FIG. 4, if refractive indices of optical elements 17-a, 17-b and an adhesion portion (air gap) of critical angle prism 17 are given as $n_1$, $n_2$ and $n_3$, respectively, refractive indices $n_1$, $n_2$ and $n_3$ have the inter relationship, $n_1 > n_2 < n_3$. Since the tilt angle of the tilt surface 170 is determined in such a way that the incident angle of most of a bundle R of light rays (FIG. 3B) from the first region (having as its boundary the plane including the optical axis of photographing lens 1-FIG. 1) becomes less than the critical angle, and the incident angle of most of another bundle L of light rays exceeds the critical angle, the bundle R of light rays from the first region of photographing lens 1 is incident on light-receiving portion 11-b of image sensor 11, which opposes tilt surface 170 of critical angle prism 17.

Similarly, the bundle L of light rays from the second region of photographing lens 1 is mainly incident on light-receiving portion 11-a of image sensor 11 which opposes tilt surface 180 of critical angle prism 18. In this manner, an object image formed by photographing lens 1 is exit pupil divided, so that an exit pupil divided object image from the respective first and second regions incuding the optical axis of photographing lens 1 is formed on image sensor 11.

When the images obtained by exit pupil dividing the object image formed by photographing lens 1 are formed on the focal plane of photographing lens 1, horizontal misalignment therebetween does not occur. However, when over-focus or under-focus occurs, horizontal misalignment also occurs and can be ascertained to exist between the exit pupil divided images, in accordance with the direction of out-of-focus.

As shown in FIG. 1, the video signal E11 obtained from image sensor 11, which is driven in synchronism with image sensor 3, has the following characteristics: (i) video signal E11 is synchronized with the output video signal E3 from image sensor 3; (ii) video signal E11 corresponds to part of the object image projected on image sensor 3; and (iii) video signal E11 is a video signal indicating a split image misaligned in accordance with the degree of out-of-focus. Video signal E11 is inserted by video composing circuit 9 in NTSC signal E6 from video processor 6. In particular, as shown in FIGS. 5B and 5D, the split image reproducing range 15 represented by video signal E11 and displayed at viewfinder 13 is inserted at substantially the center of the image range of monitor screen 14 represented by NTSC signal E6.

FIGS. 5A to 5E show display modes represented by focus data of the focus indicator apparatus shown in FIG. 1. A display mode can be selected upon operation of a display mode selection switch SW. Mode selection signal ES (ES1, ES2) is supplied to a gate circuit of viewfinder 13 and video composing circuit 9 to switch the display mode.

FIG. 5A shows an image which is out of focus. More particularly, a monitor screen 14 is illustrated when the output E6 from video processor 6 (i.e., the video signal E3 from image sensor 3) is reproduced at viewfinder 13 as the object image on the focusing surface of image sensor 3. A camera user can roughly determine the focus state of photographing lens 1 in accordance with the degree of out-of-focus on the screen 14. FIG. 5B shows the state wherein a reproduced image represented by the video signal from image sensor 11 is inserted as a split image at substantially the center 15 of screen 14 shown in FIG. 5A. When the two parts of the split image are horizontally misaligned as shown in FIG. 5B, the image is out of focus. The shift direction of the split image indicates either under-focus or over-focus. When the image is in the in-focus state, the phases of the two parts of the split image coincide with each other, so that the horizontal misalignment of the split image is eliminated. Therefore, the camera user can ascertain the in-focus state with high precision.

FIGS. 5C and 5D show examples of an under-focus indicator, an over-focus indicator, and an in-focus indicator in the vicinity of the display screen of viewfinder 13. These indicators are operated in accordance with corresponding signals, respectively. FIG. 5E shows the state wherein horizontal misalignment of the split image does not occur and an image is clearly reproduced at the viewfinder when the object image formed by photographing lens 1 is formed on the light-receiving surface of image sensor 3.

FIGS. 6A to 6D are timing charts used in explaining the vertical scan timing of an image charge stored in image sensor 11, to read the charge as a video signal representing an image located at the central portion of the screen 14 of viewfinder 13. FIG. 6A shows vertical sync signal V supplied from sync generator 4 to first drive circuit 5. This signal V is included in sync signal E41. When first drive circuit 5 receives vertical sync signal V, it drives image sensor 3 to two-dimensionally read out a charge image corresponding to the distribution of light intensity of the object image on the light-receiving surface excluding vertical blanking region Bv of image sensor 3. The video signal Iv (E3) shown in FIG. 6B is read from image sensor 3.

Image sensor 11, as shown in FIG. 1, is arranged in such a way that the boundary between the exit pupil divided images from exit pupil dividing member 10 is positioned on a line passing through substantially the center of the light-receiving surface, and the screen area of the charge image included in video signal Ip (E11) corresponds to the center between the vertical sync signals V, as shown in FIG. 6C. To read the corresponding portions of the object, which are formed on image sensors 3 and 11 with the same timing, sync generator 4 supplies, to second drive circuit 12, vertical window pulse $V_D$ (FIG. 6D), which has time interval T2 at the same phase as that of signal Ip (FIG. 6C). Vertical window pulse $V_D$ is prepared by a one-shot or the like from a pulse delayed from the trailing edge of the vertical blanking signal by time interval T3. By the same technique as described above, a horizontal window pulse having a desired phase and a desired time interval can be prepared on the basis of the horizontal sync signal. These window pulses correspond to window pulse E43 (FIG. 1). Video signal Ip or E11 (FIG. 6C) from image sensor 11 is supplied to video composing circuit 9 and is replaced by a component (representing the central portion of the screen) of video composite signal Iv or E3. In this embodiment, the substitution operation of signal Ip is performed in conjunction with the selection instruction ES of the focus data display mode.

FIG. 7 is a block diagram showing the detailed configuration of video composing circuit 9. The NTSC signal E6 from video processor 6 (FIG. 1) is supplied to first analog gate 21. The video signal E11 corresponding to the split image from image sensor 11 (FIG. 1) is supplied to second analog gate 22 through preamplifier 70 and low-pass filter (LPF) 72. Gate signals E23 and E74 are supplied to gates 21 and 22, respectively. Gate signal E74 is an ANDed output of mode selection instruction ES1 and window pulse E43 generated from sync generator 4 (FIG. 1). Gate signal E23 is an inverted output of the gate signal E74 supplied to inverter 23. When mode selection instruction ES1 is kept high, gate 21 is opened during time intervals T3 and T4 while window pulse $V_D$ or E43 is kept low (E23=1). NTSC signal E6 passes through gate 21 and becomes E9=E6. On the other hand, when window pulse $V_D$ or E43 is kept high during time interval T2, E74=1 is established, and gate 22 is opened, so that E9=E11 is established. As a result, composite output signal E9 including a video signal representing the split image is obtained. Composite output signal E9 is supplied to viewfinder 13, so that a reproduced image such as the images shown in FIGS. 5A to 5E can be displayed at viewfinder 13.

In this embodiment, out-of-focus indicators 24 and 25 and in-focus indicator 26, which are arranged in the vicinity of viewfinder 13 as shown in FIGS. 5C and 5D, are selectively turned on. For this purpose, as shown in FIG. 1, part of the video signal read by image sensor 11 is guided to focus detector 16. This focus detector 16 detects the over-focus, in-focus and under-focus states, and drives the corresponding indicator 24, 25 or 26. More particularly, focus detector 16 extracts video signals on a pair of single or a few horizontal scan lines, at an equal distance from the boundary of the exit pupil divided images of video signals from image sensor 11. By this extraction, sampling is started for the video signal above the boundary (upper video signal) and the video signal thereunder (lower video signal), from a reference time, thereby obtaining two sampled values. The level distribution phase of the upper video signal is compared to that of the lower video signal to obtain focus signal E16.

FIG. 8 is a graph showing an example of focus signal E16. When the photographing lens 1 is focused on the light-receiving surface of image sensor 11, no horizontal misalignment occurs in the exit pupil divided images, so that focus signal E16 is set at zero. Otherwise, the sign of signal E16 is set at a positive or negative level, in accordance with the direction of horizontal misalignment. Therefore, when the sign is discriminated, the focusing state of photographing lens 1 can also be discriminated.

FIG. 9 shows a discriminator for discriminating and indicating the focus condition in accordance with focus signal E16. In the focus indicator apparatus shown in FIG. 1, the discriminator is built into viewfinder 13 to turn on a predetermined light-emitting diode (LED)

connected to the discriminator, thereby turning on the corresponding indicator 24, 25 or 26, as shown in FIGS. 5C and 5D. Referring to FIG. 9, the sign of the focus signal E16 from focus detector 16 is detected by comparators 27 and 28. As previously described, the focus signal E16 is set at zero when the in-focus state is obtained. Outputs from comparators 27 and 28 are supplied via inverters 29 and 30 to AND gate 31. When the selection instruction ES2 supplied to AND gate 31 is set at logic level "1", the output from gate 31 goes to logic level "1". The LED (e.g., green LED) 26 goes on, to indicate the in-focus state. In this case, the outputs from comparators 27 and 28 are set at zero, and the LEDs 24, 25 indicating out of focus cannot go on.

However, when the sign of focus signal E16 is set at a positive or negative level and the potential of signal E16 exceeds the positive threshold level of comparator 27 or the negative threshold level of comparator 28, the output from comparator 27 or 28 goes to logic level "1". The outputs from comparators 27 and 28 are supplied to the over-focus LED (e.g., red LED) 24 and the under-focus LED (e.g. red LED) 25 through AND gates 32 and 33, respectively. When the selection signal ES2 at logic level "1" is supplied to AND gates 32 and 33, LED 24 or 25 goes on in accordance with the potential sign of signal E16. Therefore, the camera user can note the direction of horizontal misalignment in the out-of-focus state.

Instead of a display by LEDs 24 to 26, display of the under-focus, in-focus and over-focus states may be performed as part of an image display within the monitor CRT screen 14 of viewfinder 13, in accordance with signal E16.

The relationship between the selection signals ES (ES1, ES2) and monitor images in FIGS. 5A to 5D can be summarized as follows:

TABLE 1

| Monitor image | ES2 | ES1 |
|---|---|---|
| FIG. 5A | 0 | 0 |
| FIG. 5B | 0 | 1 |
| FIG. 5C | 1 | 0 |
| FIG. 5D | 1 | 1 |

Figure 10:
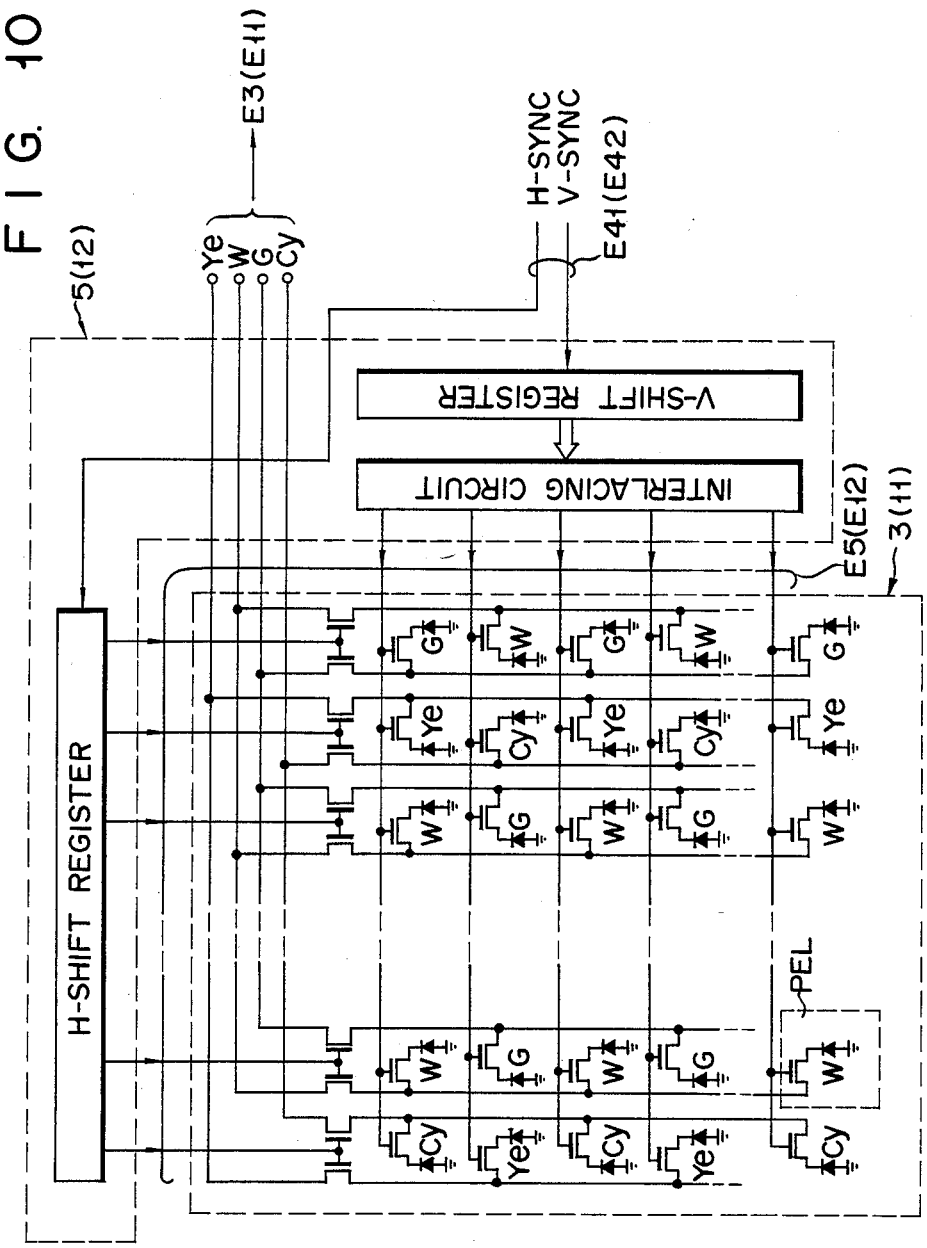
FIG. 10 is a circuit diagram showing the configuration of image sensor 3 (or 11) and drive circuit 5 (or 12)

FIG. 10 is a circuit diagram showing the detailed arrangement of drive circuit 5 (or 12) when a two-dimensional MOS image sensor is adopted for use as image sensor 3 (or 11). The horizontal sync pulse (H-SYNC) of sync signal E41 (or E42) is supplied to a horizontal shift register, and the vertical sync pulse is supplied to a vertical shift register. Outputs from the horizontal shift register are used as column gate signals of a sensor matrix. Outputs from the vertical shift register serve as row gate signals of the sensor matrix, through an interlacing circuit. Ye (yellow), W (white), G (green) and Cy (cyan) signals from the matrix serve as video signals E3 (or E11).

Figure 11:
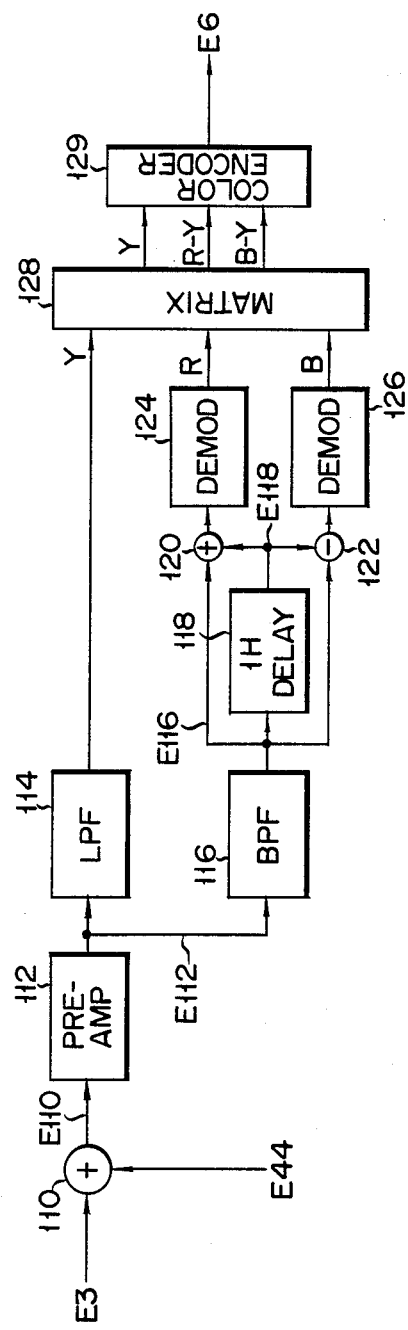
FIG. 11 is a block diagram of video processor 6, as shown in FIG. 1.

FIG. 11 is a block diagram showing the detailed arrangement of video processor 6. Video signal E3 is supplied to sync signal superposing circuit 110. Circuit 110 also receives composite sync signal E44 and generates video signal E110 on which composite sync signal E44 is superposed. Signal E110 is amplified by preamplifier 112. Output signal E112 from preamplifier 112 is supplied to low-pass filter (LPF) 114 and to band-pass filter (BPF) 116. Low-pass filter 114 separates the luminance or Y signal from the amplified signal, and band-pass filter 116 separates chroma signal E116 from the amplified signal. Signal E116 is delayed by 1H delay circuit 118 by one horizontal scanning period and becomes 1H-delayed signal E118. Signals E116 and E118 are added by adder 120. A resultant sum signal is then demodulated by color demodulator 124. Color demodulator 124 generates an R signal. Meanwhile, signals E116 and E118 are subtracted from each other by subtractor 122. A subtracted signal is demodulated by color demodulator 126. Color demodulator 126 generates a B signal. The Y, R and B signals are converted by color matrix 128 to luminance signal Y and color difference signals R-Y and B-Y. These signals are converted by color encoder 129 to NTSC color TV signal E6.

FIG. 12 is a block diagram showing the main part of sync generator 4. The configuration of the circuit shown in FIG. 12 is the same as the internal configuration of LSI #MN6064 (manufactured by MATSUSHITA ELECTRIC CO., Japan), a commercially available conventional circuit. Therefore, a detailed description of this circuit will be omitted here.

Figure 13:
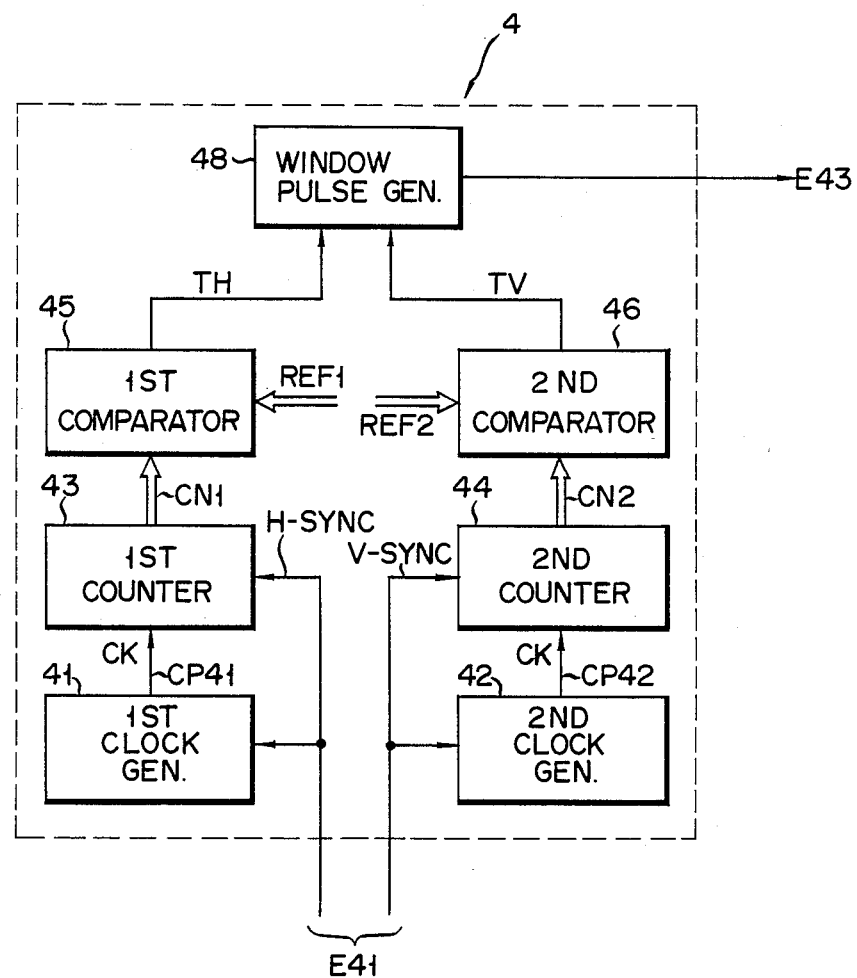
FIG. 13 is a block diagram showing a portion of sync generator 4 (FIG. 1), which generates window pulse E43.

FIG. 13 shows that part of sync generator 4 which generates window pulse E43. The H-SYNC signal of sync signal E41 is supplied to a first counter 43, and the V-SYNC signal thereof is supplied to a second counter 44. Clock pulses CP41 and CP42 are supplied from first and second clock generators 41 and 42 to first and second counters 43 and 44, respectively. Pulse CP41 is generated at a rate of, e.g., five pulses per horizontal scan period (1H) in synchronism with the H-SYNC signal. Pulse CP42 is generated at a rate of, e.g., five pulses per vertical scan period (1V) in synchronism with the V-SYNC signal. First counter 43 is reset by the trailing edge of the H-SYNC signal. First counter 43 counts five CP41 pulses during each 1H period and generates a 3-bit count output CN1 within a range between "000" and "100". Second counter 44 is reset by the trailing edge of the V-SYNC signal. Second counter 44 counts five CP42 pulses during each 1V period and generates a 3-bit count output CN2 within a range between "000" and "100".

Count output CN1 is supplied to a first comparator 45. Comparator 45 also receives comparison signal REF1 and generates a horizontal window pulse TH of logic level "1" when CN1=REF1. Similarly, count output CN2 is compared to comparison signal REF2 by second comparator 46. When CN2=REF2, comparator 46 generates a vertical window pulse TV of logic level "1". Window pulses TH and TV are supplied to the window pulse generator 48. Pulses TH and TV are logically ANDed by the generator 48. In this case, when pulses TH and TV are set at logic level "1", generator 48 generates window pulse E43.

The following is based on the relationship wherein REF1=REF2="010". In this case, during the time interval after counter 43 has counted the leading edge of third pulse CP41 but before counter 43 counts the leading edge of fourth pulse CP41, pulse TH is kept at logic level "1". During the time interval after counter 43 has counted the leading edge of third pulse CP42 but before counter 43 counts the fourth leading edge, pulse TV is set at logic level "1". In other words, when the TV screen is vertically divided into five regions, pulse TH is set to be logic "1" at the central region (third region). Similarly, when the TV screen is horizontally divided into five regions, pulse TV is set to be logic "1" at the central region (third region). Therefore, when the TV screen area is divided into 25 regions, pulses TH and TV are set at logic level "1" (i.e., E43="1") in the central region of the screen area.

A two-part split image may be inserted by the configuration shown in FIG. 7, at the center (E43="1") of the screen.

FIG. 14 is a block diagram showing the detailed configuration of focus detector 16. Video signal E11 from image sensor 11 is supplied to gate 16C through preamplifier 16A and low-pass filter 16B. Gate 16C also receives window pulse E43 and is enabled to pass monochrome image signal E16C, which corresponds to signal E11, during a time interval wherein window pulse E43 is set at logic level "1". Signal E16C, passing through gate 16C, is supplied to sample/hold circuit (S/H) 16D. The components of signal E16C corresponding to outputs from pels of image sensor 11 are sampled/held. The sampled/held output E16D from circuit 16D is supplied to A/D converter 16E. A/D converter 16E converts pel data of portion 11-a of image sensor 11 to digital signal E16EA and pel data of portion 11-b to digital signal E16EB.

Figure 15B:
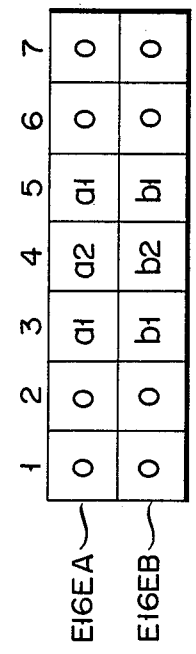
FIG. 15B is a data format showing data which is stored in RAMs 16F and 16G and which corresponds to the projected images of FIG. 15A.
Figure 16B:
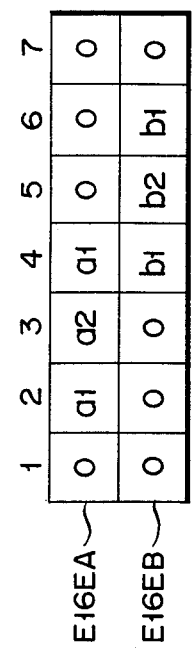
FIG. 16B is a data format showing data which is stored in RAMs 16F and 16G and which corresponds to the projected images (split image) shown in FIG. 16A.
Figure 15A:
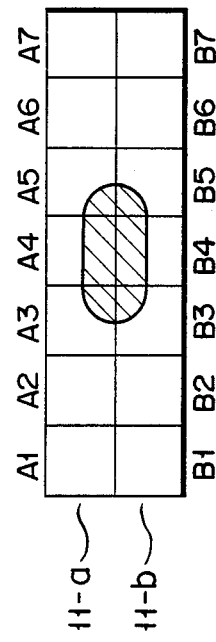
FIG. 15A shows, in an in-focus state, an image projected on a pel group (array A) of image sensor 11, through prism 17, as shown in FIG. 3B, and an image projected on another pel group (array B), through prism 18, as shown in FIG. 3C.
Figure 16A:
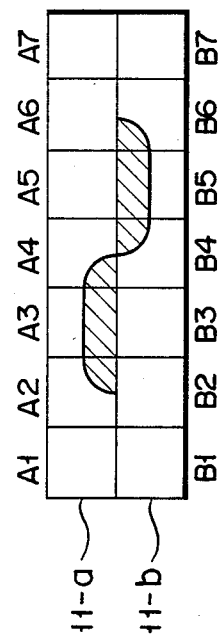
FIG. 16A shows projected images corresponding to those of FIG. 15A, in an out-of-focus state.

To readily understand the operation of focus detector 16, it is to be noted that the number of pels of both portions 11-a and 11-b is seven. The split image projected on image sensor 11 in the in-focus state is formed at pels A3, A4, A5, B3, B4 and B5, as shown in FIG. 15A. The data formats of digital signals E16EA and E16EB are shown in FIG. 15B. Pels of portion 11-a have data of zero when no projected image component is detected thereat. However, pels have data a1 or a2 in accordance with a size of a projected image component in the corresponding pel when the projected image components are detected thereat. Similarly, pel data of a portion having an image component and a portion having no image component, at pels of portion 11-b, is set at zero and b1 or b2, respectively. When a split image in the out-of-focus state is given as shown in FIG. 16A, the data formats of signals E16EA and E16EB are as shown in FIG. 16B.

Referring again to FIG. 14, signal E16EA is stored in RAM 16F. The contents of RAM 16F correspond to data of the upper row in FIG. 15B or 16B. Signal E16EB is stored in RAM 16G. The contents of RAM 16G correspond to data of the lower row in FIG. 15B or 16B.

Data E16F stored in RAM 16F is sequentially transferred to register 16H. Register 16H stores two word $A_n$, $A_{n+1}$ from the data E16F (eg., A2 and A3 in FIG. 15A, or 0 and a1 in FIG. 15B). The content of register 16H is sequentially updated (N=1, 2, ..., 7). Similarly, data E16G stored in RAM 16G is sequentially transferred to register 16I. Register 16I stores two words $B_n$, $B_{n+1}$ from the data E16G (N=1, 2, ..., 7).

The $A_{n+1}$ output from register 16H and the $B_n$ output from register 16I are supplied to subtracter 16J. Subtracter 16J produces digital signal E16J, which corresponds to difference $(A_{n+1} - B_n)$. The $A_n$ output from register 16H and the $B_{n+1}$ output from register 16I are supplied to subtracter 16K. Subtracter 16K produces digital signal E16K, which corresponds to different $(A_n - B_{n+1})$.

Signal E16J is supplied to absolute value circuit (ABSOL CKT) 16L, and signal E16K is supplied to absolute value circuit 16M. Circuits 16L and 16M check sign bits of input signals E16J and E16K, respectively. When the sign bit of input signal E16J (or E16K) is set at "0", indicating a positive value, input signal E16J (or E16K) passes through circuit 16L (or 16M) without any change. However, when the sign bit of input signal E16J (or E16K) is set at "1", indicating a negative value, this sign bit is set at "0" by circuit 16L (or 16M). In other words, a negative value is converted to the corresponding positive value. Signal E16J (or E16K), having a value converted from negative to positive is produced from circuit 16L (or 16M). Therefore, circuits 16L and 16M produce digital signals E16L and E16M, which correspond to absolute values of input signals E16J and E16K, respectively.

Signals E16L and E16M are supplied to subtracter 16N. Digital signal E16N, which corresponds to difference (E16M−E16L), is supplied from subtracter 16N to accumulator 16P. Accumultor 16P accumulates signals E16N and produces accumulation result E16P, which is given as follows:

$$E16P = \sum_{n=1}^{6} \{|A_n - B_{n+1}| - |A_{n+1} - B_n|\} \quad (1)$$

This accumulation result E16P is converted by D/A converter 16Q to an analog signal, thereby obtaining focusing signal E16.

The contents of RAM 16F, RAM 16G and accumulator 16P are cleared in units of TV screen frames.

Focus detector 16, as shown in FIG. 14, is operated as follows. Let us assume that analog values corresponding to data a1, a2, b1 and b2, as shown in FIGS. 15B and 16B, are given as 0.2, 0.5, 0.2 and 0.5 volts, respectively. The calculation results according to equation (1) in the in-focus state of FIGS. 15A and 15B are given as follows:

$$
\begin{array}{rl}
|A1-B2| - |A2-B1| = & |0 - 0| - |0 - 0| = 0 - 0 = 0 \\
|A2-B3| - |A3-B2| = & |0 - b1| - |a1 - 0| = 0.2 - 0.2 = 0 \\
|A3-B4| - |A4-B3| = & |a1-b2| - |a2-b1| = 0.3 - 0.3 = 0 \\
|A4-B5| - |A5-B4| = & |a2-b1| - |a1-b2| = 0.3 - 0.3 = 0 \\
|A5-B6| - |A6-B5| = & |a1 - 0| - |0 - b1| = 0.2 - 0.2 = 0 \\
|A6-B7| - |A7-B6| = & |0 - 0| - |0 - 0| = 0 - 0 = 0 \\
\hline
+ & = 0
\end{array}
$$

Signal E16P or E16 becomes zero in the in-focus state (focal point in FIG. 8).

The calculation result according to equation (1) in the over-focus state of FIGS. 16A and 16B are given as follows:

$$
\begin{array}{rl}
|A1-B2| - |A2-B1| = & |0 - 0| - |a1 - 0| = 0 - 0.2 = -0.2 \\
|A2-B3| - |A3-B2| = & |a1 - 0| - |a2 - 0| = 0.2 - 0.5 = -0.3 \\
|A3-B4| - |A4-B3| = & |a2-b1| - |a1 - 0| = 0.3 - 0.2 = 0.1 \\
|A4-B5| - |A5-B4| = & |a1-b2| - |0 - b1| = 0.3 - 0.2 = 0.1 \\
|A5-B6| - |A6-B5| = & |0 - b1| - |0 - b2| = 0.2 - 0.5 = -0.3 \\
|A6-B7| - |A7-B6| = & |0 - 0| - |0 - b1| = 0 - 0.2 = -0.2 \\
\hline
+ & = -0.8
\end{array}
$$

Signal E16P or E16 has a negative value in the over-focus state (i.e., in the over focus shown in FIG. 8).

The direction of horizontal misalignment in the under-focus state is opposite to that in the over-focus state (i.e., the A row is shifted to the right and the B row is shifted to the left). In this case, according to equation (1), the signal E16P or E16 having a positive value (i.e., the under-focus state shown in FIG. 8) can be obtained.

When the projected images of the A and B rows are not symmetrical with each other in the split image of FIG. 16A, the relationship wherein E16=0 cannot be obtained in the in-focus state. However, even in this case, signal E16 has a value very close to zero. Therefore, no problem occurs in practice even if the in-focus state is detected at E16=0 for the asymmetrical split image. When the image width along the vertical direction of the split image is narrow and/or the number of pels along the horizontal direction (number n in equation (1)) is great, signal E16 is set to be substantially zero in the in-focus state. Signal E16 may be weighted and a proper level (E16≠0) may be used as an in-focus reference level.

Figure 17:
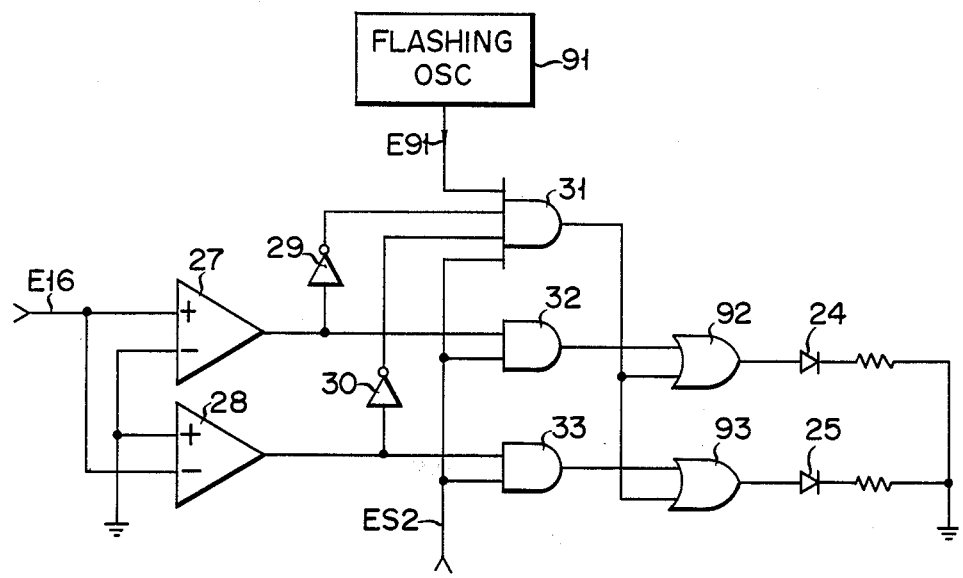
FIG. 17 is a circuit diagram showing a modification of the discriminator shown in FIG. 9.

FIG. 17 shows a modification of the discriminator shown in FIG. 9. Since the same reference numerals used in FIG. 9 denote the same parts in FIG. 17, a detailed description thereof will be omitted. An output from AND gate 32 is supplied to LED 24 through OR gate 92. An output from AND gate 33 is supplied to LED 25 through OR gate 93. An output from AND gate 31 is supplied to OR gates 92 and 93. Flashing pulse E91 is supplied from a flashing oscillator 91 to the fourth input terminal of AND gate 31. Pulse E91 is a 50% duty pulse having a frequency of, e.g., from 2 to 3 Hz. When AND gates 32 and 33 are closed and AND gate 31 is opened in the in-focus state, LEDs 24 and 25 flash in accordance with pulse E91. The operation of the LEDs in the out-of-focus state is the same as that of FIG. 9.

Oscillator 91 may be omitted in FIG. 17. In this case, LEDs 24 and 25 are simultaneously lighted in the in-focus state, thereby performing in-focus display. Furthermore, if the output from AND gate 31 is supplied to one of OR gates 92 and 93 through an inverter, LEDs 24 and 25 alternately flash in the in-focus state.

Figure 18:
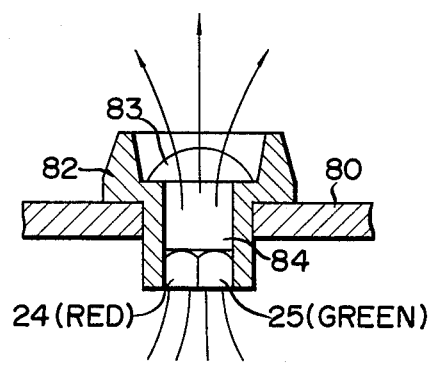
FIG. 18 is a sectional view of a construction wherein two LEDs 24, 25 are mounted on a single bracket.

FIG. 18 shows the construction wherein LEDs 24 and 25 are arranged in single bracket 82. LEDs 24 and 25 emit light outside of bracket 82 through converging rod 84 and light-scattering lens 83. Assume that LEDs 24 and 25 are constituted by red and green LEDs, respectively. Red LED 24 goes on in the over-focus state (E16<0). Green LED 25 goes on in the under-focus state (E16>0). LEDs 24 and 25 simultaneously go on or flash in the in-focus state (E16≈0). In this case, an orange light beam is emitted outside of bracket 82, since red and green light rays are mixed in rod 84.

In the above embodiment, the exit pupil dividing member is provided to project a split image having horizontal misalignment in the out-of-focus state. However, the exit pupil dividing member and focus detecting image sensor can be omitted. In this case, the output video signal from the photographing image sensor is processed to detect the out-of-focus state in accordance with a known evaluation technique. The video signal is electrically processed to reproduce the split image at the center of the screen, in accordance with the direction and magnitude of horizontal misalignment. Furthermore, instead of reproducing the split image only at the central portion of the screen, the screen may be divided into upper and lower halves. In this case, the upper and lower halves are horizontally misaligned from each other in accordance with the degree of out-of-focus.

As may be seen from the above description of the preferred embodiment of the present invention, part of the screen of the viewfinder for reproducing an output taken by a camera, such as a television camera, displays a split image, wherein horizontal misalignment occurs in the out-of-focus state. Therefore, as compared to the conventional focusing technique wherein a vague image is adjusted to a clear image in the viewfinder, the camera user can visually check the focus states (in-focus, over-focus, and under-focus) by means of the split image, thereby easily and precisely performing the focusing operation. Furthermore, in the above embodiment, wherein predetermined indicators arranged in the vicinity of the viewfinder are operated in accordance with the focusing signal indicating one of the focus states, the varied display modes shown in FIGS. 5A to 5D can be selected. When the display mode in FIG. 5D is selected; in addition to display of the focus state by means of split image 15, one of the indicators or LEDs 24, 25 and 26 goes on, in accordance with the corresponding focus state. Therefore, the focus data can be clearly checked by visual observation.

Apparatuses which may be used in conjunction with the focus indicator appartus of the present invention are listed below. These apparatuses are incorporated in the present invention.

(1) U.S. Ser. No. 254,299 (filed on April 15, 1981)
"Iris Servo Apparatus"
Inventor: Kenji KIMURA (2) U.S. Ser. No. 262,917 (filed on May 12, 1981)
"Focusing Apparatus for Image Pickup Device"
Inventor: Kenji KIMURA (3) U.S. Ser. No. 262,918 (filed on May 12, 1981)
"Focus Control Apparatus"
Inventor: Kenji KIMURA (4) U.S. Ser. No. 396,799 (filed on July 9, 1982)
"Data Recording/Reproducing Apparatus"
Inventor: Kenji KIMURA (5) U.S. Ser. No. 396,778 (filed on July 9, 1982)
"Solid-State Image Pickup Device"
Inventor: Kenji KIMURA (6) U.S. Pat. No. 4,325,080 (issued on April 13, 1982)
"Apparatus for Displaying Video Track Number in Viewfinder of Video Camera"
Inventor: Ken SATOH

What is claimed is:

1. A focus indicator apparatus for an electronic camera, comprising:

first video means for converting an object image to a first video signal;

second video means for converting part of said object image to a split image and, thereafter, for converting the split image to a second video signal;

composing means coupled to said first and said second video means, for combining said second video signal with part of said first video signal and providing a composite video signal; and display means coupled to said composing means, for displaying an image corresponding to said composite video signal, the split image derived from said object image on the basis of said second video signal being adapted to function as a focus indicator;

said display means being provided with a monitor screen on which said object image and said split image are simultaneously displayed in a manner that a given part of said object image is replaced with said split image;

said first video means including first means for generating a color video signal, including color information on said object image, in accordance with a first sync signal, and second means coupled to said firrst means for composing said first video signal, including the color information from said color video signal, in accordance with a composite sync signal; and said second video signal being a monochrome signal, so that an image displayed on said display means has said split image as a monochrome image and a remaining image portion as a color image.

2. A focus indicator apparatus for an electronic camera, comprising;

first video means for converting an object image to a first video signal;

second video means for converting part of said object image to a split image and, thereafter, for converting the split image to a second video signal;

window means for generating a window pulse which defines the location of said split image with respect to the area of said object image;

composing means coupled to aid first video means, said second video means and said window means, for inserting said second video signal into said first video signal in accordance with the generation of said window pulse, and providing a composite signal coresponding to the combination of said first and said second video signals; and display means coupled to said composing means, for displaying an image corresponding to said composite video signal, the split image derived from said object image on the basis of said second video signal being adapted to function as a focus indicator;

said first video means including first means for generating a color video signal, including color information on said object image, in accordance with a first sync signal, and second means coupled to said first means for composing said first video signal, including the color information from said color video signal, in accordance with a composite sync signal; and said second video signal being a monochrome signal, so that an image displayed on said display means has said split image as a monochrome image and a remaining image portion as a color image.

3. A focus indicator apparatus for an electronic camera, comprising:

first video means for converting an object image to a first video signal;

second video means for converting part of said object image to a split image and, thereafter, for converting the split image to a second video signal;

composing means coupled to said first and said second video means, for combining said second video signal with part of said first video signal and providing a composite video signal; and display means coupled to said composing means, for displaying the image corresponding to said composite video signal, the split image derived from said object image on the basis of said second video signal being adapted to function as a focus indicator;

wherein said first video means includes first means for generating a color video signal, including color information on said object image, in accordance with a first sync signal, and second means coupled to said first means for composing said first video signal, including the color information from said color video signal, in accordance with a composite sync signal; and wherein said second video signal is constituted by a monochrome signal, so that an image displayed on said display means has said split image as a monochrome image and a remaining image portion as a color image.

4. A focus indicator apparatus for an electronic camera, comprising:

first video means for converting an object image to a first video signal;

second video means for converting part of said object image to a split image and, thereafter, for converting the split image to a second video signal;

composing means coupled to said first and said second video means, for combining said second video signal with part of said first video signal and providing a composite video signal; and display means coupled to said composing means, for displaying an image corresponding to said composite video signal, the split image derived from said object image on the basis of said second video signal being adapted to function as a focus indicator;

wherein said first video means includes a first image sensor arranged along an optical axis of an optical system of said electronic camera;

wherein said second video means includes a second image sensor which is so arranged as to be optically conjugate with said first image sensor or in the vicinity of a conjugate position, a half mirror disposed along said optical axis of said optical system to guide said object image to said second image sensor, and optical means disposed between said second image sensor and said half mirror, for exit pupil dividing an optical image guided from said half mirror to said second image sensor, and for converting said optical image to said split image;

wherein said optical means includes:

a first critical angle prism for guiding part of said optical image to a first region of said second image sensor; and a second critical angle prism for guiding another part of said optical image to a second region of said second image sensor.

5. A focus indicator apparatus for an electronic camera, comprising:

split means for converting an object image into a two-part split image;

converting means coupled to said split means, for converting said two-part split image to a video signal;

separating means coupled to said converting means, for separating a first split video signal corresponding to one part of said two-part split image and a second split video signal corresponding to the other part of said two-part split image from said video signal;

signal processing means coupled to said separating means, for generating a focusing signal from said first and second split video signals, said focusing signal having a potential which changes in accordance with the focus state of said object image; and means, coupled to said signal processing means, for indicating whether said object image is held in an in-focus state or an out-of-focus state, in accordance with the potential of said focusing signal;

wherein said signal processing means includes:

first memory means coupled to said separating means, for storing data corresponding to said first split video signal;

second memory means coupled to said separating means, for storing data corresponding to said second split video signal;

first register means coupled to said first memory means, for reading out two adjacent items of data $A_{n'}$, $A_{n+1}$ (where n is a natural number) from among data stored in said first memory means;

second register means coupled to said second memory means, for reading out two adjacent items of data $B_n$, $B_{n+1}$ (where n is a natural number) from among data stored in said second memory means;

first differential means coupled to said first and second register means, for generating a first differential signal indicating the absolute value ($|A_{n+1}-B_n|$) of a difference between said items of data $A_{n+1}$, $B_n$;

second differential means coupled to said first and second register means, for generating a second differential signal indicating the absolute value ($|A_n-B_{n+1}|$) of a difference between said items of data $A_n$, $B_{n+1}$;

third differential means coupled to said first and second differential means, for generating a third differential signal corresponding to a difference between said first and second differential signals; and accumulating means coupled to said third differential means, for accumulating said third differential signal to obtain said focusing signal.

6. A focus indicator apparatus for an electronic camera, comprising:

a first video means for converting an object image to a first video signal;

second video means for converting part of said object image to a split image and, thereafter, for converting the split image to a second video signal;

composing means coupled to said first and second video means, for combining said second video signal with part of said first video signal and providing a composite video signal; and display means coupled to said composing means, for displaying an image corresponding to said composite video signal, the split image derived from said object image on the basis of said second video signal being adapted to function as a focus indicator;

wherein said first video means includes first means for generating a color video signal, including color information on said object image, in accordance with a first sync signal, and second means coupled to said first means for composing said first video signal, including the color information from said color video signal, in accordance with a composite sync signal;

wherein said second video signal is constituted by a monochrome signal, so that an image displayed on said display means has said split image as a monochrome image and a remaining image portion as a color image; and wherein said second video means includes an optical exit pupil dividing means for dividing part of said object image and for converting said divided object image part to said split image.

7. A focus indicator apparatus for an electronic camera, comprising:

first video means for converting an object image to a first video signal;

second video means for converting part of said object image to a split image and, thereafter, for converting the split image to a second video signal;

composing means coupled to said first and said second video means, for combining said second video signal with part of said first video signal and providing a composite video signal; and display means coupled to said composing means, for displaying an image corresponding to said composite video signal, the split image derived from said object image on the basis of said second video signal being adapted to function as a focus indicator;

wherein said first video means includes a first image sensor arranged along an optical axis of an optical system of said electronic camera;

wherein said second video means includes a second image sensor which is so arranged as to be optically conjugate with said first image sensor or in the vicinity of a conjugate position, a half mirror disposed along said optical axis of said optical system to guide said object image to said second image sensor, and optical means disposed between said second image sensor and said half mirror, for exit pupil dividing an optical image guided from said half mirror to said second image sensor, and for converting said optical image to said split image;

wherein said optical means includes:

a first critical angle prism for guiding part of said optical image to a first region of said second image sensor; and a second critical angle prism for guiding another part of said optical image to a second region of said second image sensor; and wherein said second video means includes an optical exit pupil dividing means for dividing part of said object image and for converting said divided object image part to said split image.

8. A focus indicator apparatus for an electronic camera, comprising:

first video means for converting an object image to a first video signal;

second video means for converting part of said object image to a split image and, thereafter, for converting the split image to a second video signal;

composing means coupled to said first and said second video means, for combining said second video signal with part of said first video signal and providing a composite video signal; and display means coupled to said composing means, for displaying an image corresponding to said composite video signal, the split image derived from said object image on the basis of said second video signal being adapted to function as a focus indicator;

said display means being provided with a monitor screen on which said object image and said split image are simultaneously displayed in a manner that a given part of said object image is replaced with said split image;

said first video means including a first image sensor arranged along an optical axis of an optical system of said electronic camera;

said second video means including a second image sensor which is so arranged as to be optically conjugate with said first image sensor or in the vicinity of a conjugate position, a half mirror disposed along said optical axis of said optical system to guide said object image to said second image sensor, and optical means disposed between said second image sensor and said half mirror, for dividing an optical image guided from said half mirror to said second image sensor, and for converting said optical image to said split image; and said optical image means including: a first critical angle prism for guiding part of said optical image to a first region of said second image sensor; and a second critical angle prism for guiding another part of said optical image to a second region of said second image sensor.

9. A focus indicator apparatus for an electronic camera, comprising:

first video means for converting an object image to a first video signal;

second video means for converting part of said object image to a split image and, thereafter, for converting the split image to a second video signal;

window means for generating a window pulse which defines the location of said split image with respect to the area of said object image;

composing means coupled to said first video means, said second video means and said window means, for inserting said second video signal into said first video signal in accordance with the generation of said window pulse, and providing a composite signal corresponding to the combination of said first and said second video signals; and display means coupled to said composing means, for displaying an image corresponding to said composite video signal, the split image derived from said object image on the basis of said second video signal being adapted to function as a focus indicator;

said first video means including a first image sensor arranged along an optical axis of an optical system of said electronic camera;

said second video means including a second image sensor which is so arranged as to be optically conjugate with said first image sensor or in the vicinity of a conjugate position, a half mirror disposed along said optical axis of said optical system to guide said object image to said second image sensor, and optical means disposed between said second image sensor and said half mirror, for dividing and optical image guided from said half mirror to said second image sensor, and for converting said optical image to said split image; and said optical means including: a first critical angle prism for guiding part of said optical image to a first region of said second image sensor; and a second critical angle prism for guiding another part of said image to a second region of said second image sensor.

10. An apparatus according to claim 3 or 4, further comprising:

indicator means coupled to said second video means and said display means, for indicating the focus state of said object image.

11. An apparatus according to claim 3 or 4, wherein said composing means includes:

first gate means for selectively passing said first video signal therethrough in response to a first gate signal, and second gate means for selectively passing said second video signal therethrough in response to a second gate signal, said first and second gate signals having opposite signal levels, and one of said first and second gate means being in through state; and wherein the sum of the outputs from said first and second gate means corresponds to said composite video signal.

12. An apparatus according to claim 11, further comprising window means for generating a window pulse at a position corresponding to a predetermined location within a frame of the video image in synchronism with horizontal and vertical sync signals of the video image, wherein said composing means further includes means coupled to said window means, for generating said first and second gate signals from said window pulse in such a way as to correspond thereto.

* * * * *